(12) United States Patent
Foster et al.

(10) Patent No.: US 8,576,283 B1
(45) Date of Patent: Nov. 5, 2013

(54) HASH-BASED CHAIN OF CUSTODY PRESERVATION

(75) Inventors: Robert F. Foster, Ramsey, MN (US); Edward E. Burns, Maple Grove, MN (US)

(73) Assignee: Target Brands, Inc., Minneapolis, MN (US)

( * ) Notice: Subject to any disclaimer, the term of this patent is extended or adjusted under 35 U.S.C. 154(b) by 805 days.

(21) Appl. No.: 12/652,156

(22) Filed: Jan. 5, 2010

(51) Int. Cl.
*H04N 7/18* (2006.01)

(52) U.S. Cl.
USPC .......................... 348/143; 348/150; 348/152

(58) Field of Classification Search
USPC .................................. 348/159, 143, 150, 152
See application file for complete search history.

(56) References Cited

U.S. PATENT DOCUMENTS

| | | | |
|---|---|---|---|
| 6,625,295 B1 | 9/2003 | Wolfgang et al. | |
| 6,963,973 B2 | 11/2005 | Chapman et al. | |
| 7,508,941 B1 * | 3/2009 | O'Toole et al. | 380/228 |
| 8,220,711 B2 * | 7/2012 | McIntyre | 235/385 |
| 2002/0157005 A1 | 10/2002 | Brunk et al. | |
| 2004/0146272 A1 * | 7/2004 | Kessel et al. | 386/46 |
| 2004/0260733 A1 * | 12/2004 | Adelstein et al. | 707/202 |
| 2005/0036651 A1 | 2/2005 | Wen | |
| 2005/0185823 A1 * | 8/2005 | Brown et al. | 382/103 |
| 2006/0004580 A1 * | 1/2006 | Claudatos et al. | 704/275 |
| 2006/0106718 A1 * | 5/2006 | Spellman et al. | 705/50 |
| 2007/0092103 A1 | 4/2007 | Mihcak et al. | |
| 2008/0098219 A1 | 4/2008 | Forte | |
| 2008/0231708 A1 * | 9/2008 | Morimoto et al. | 348/159 |
| 2008/0240490 A1 | 10/2008 | Finkelstein et al. | |
| 2009/0080694 A1 | 3/2009 | Levy et al. | |
| 2009/0164517 A1 * | 6/2009 | Shields et al. | 707/104.1 |
| 2010/0066835 A1 * | 3/2010 | Colciago | 348/159 |
| 2010/0157062 A1 * | 6/2010 | Baba et al. | 348/156 |
| 2010/0274816 A1 * | 10/2010 | Guzik | 707/802 |
| 2011/0018998 A1 * | 1/2011 | Guzik | 348/143 |
| 2012/0098970 A1 * | 4/2012 | Amini et al. | 348/159 |

FOREIGN PATENT DOCUMENTS

| | | |
|---|---|---|
| WO | WO98/11492 | 3/1998 |
| WO | WO02/50773 | 6/2002 |

OTHER PUBLICATIONS

Chain of Custody, How the Phoenix™ digital video asset management solution provides proper Chain of Custody capabilities, Phoenix™ Market White Paper, SoleraTec™, Copyright 1997-2009.

* cited by examiner

*Primary Examiner* — Rupal Dharia
*Assistant Examiner* — Joe Chacko
(74) *Attorney, Agent, or Firm* — Merek, Blackmon & Voorhees, LLC

(57) ABSTRACT

In one embodiment, a chain of custody management application is configured to receive electronic recordings and physical evidence data, associate them with a security event, and automatically create and embed a hash value that aids in the authentication of both the electronic recordings and the physical evidence. A case management system may create a case record for an incident, present a form to the user, and prompt the user to electronically associate an electronic recording and physical evidence to the case record. The case management system optionally issues a call to a verification system which, in this example, automatically creates a first hash value from the electronic recording data and a second hash value from the physical evidence data. The hash values may then be embedded in an electronic case record form that may be printed on demand for use by government authorities.

18 Claims, 6 Drawing Sheets

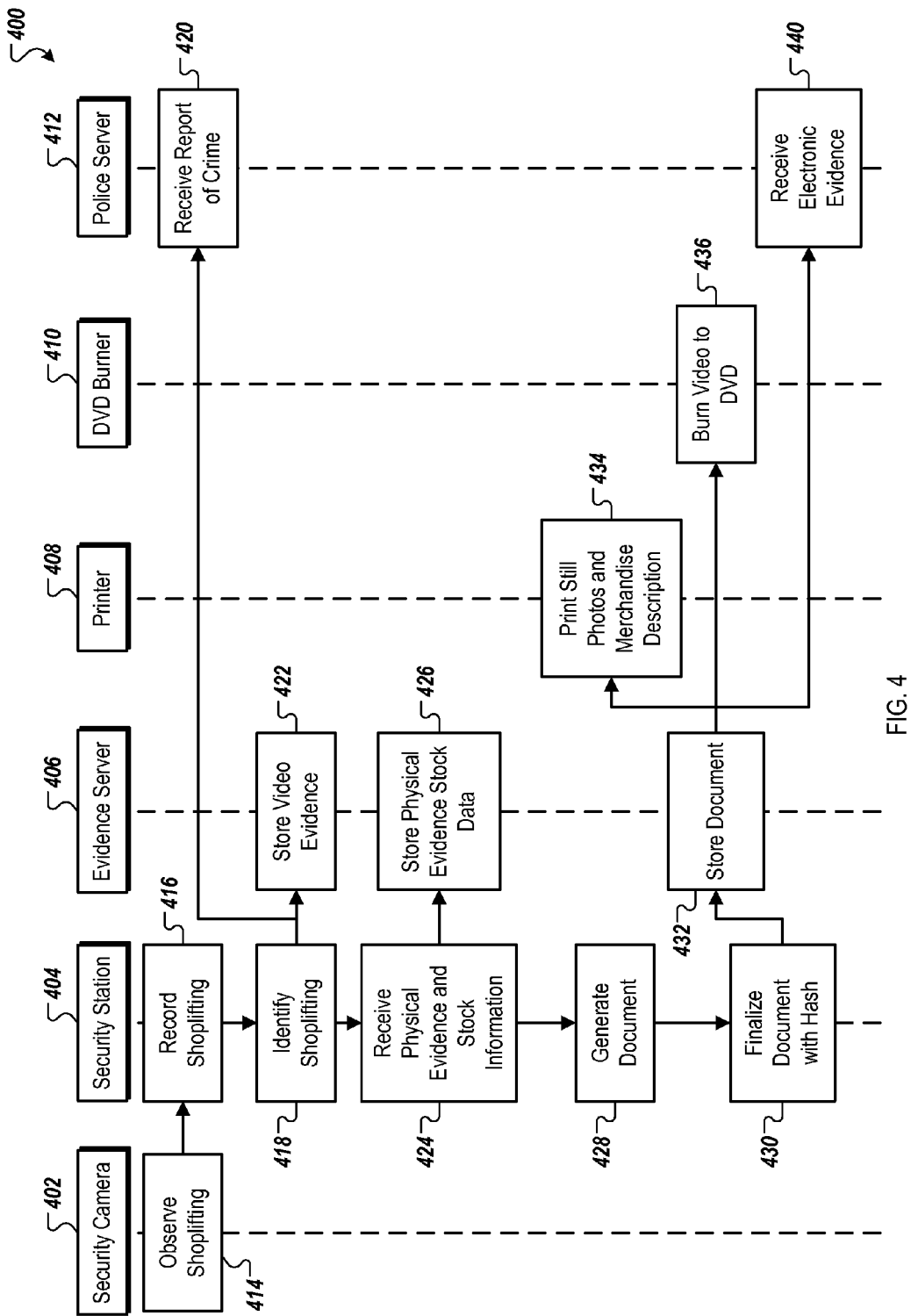

Digital Video Evidence Chain of Custody Form — 500

- 502: LAN ID/ User Name
- 504: Password (masked)
- 506: Date / Time
- 508: Case Management Number
- 509: Disposition of Evidence
  1. Return to Stock – Take Photos
  2. Hold Item – Describe Location
  3. Transfer to Government Entity
- 514: Evidence Type / Format ▼
- 510: Recipient's Name / Title or Rank
- 512: Organization or Agency Name
- 516: CD-R
- 518: DVD
- 520: Physical
- 522: What is the file name(s) recorded to the disk(s)?
  Case 1234/Location 456/Theft/Enterance Camera View.mpg
  Case 1234/Location 456/Theft/Parking Lot Camera View.mpg
  Case 1234/Location 456/Vandalism/Damaged Property/Lock.dat
- 524: Browse
- 526: Create a Unique Identification Number for the File(s)
- 528: Submit / Print
- 530: Hash
- 532:
  ☐ Initial and date the item(s) of evidence (CD, DVD, etc)
  ☐ If printing is available, print two copies that will be signed by both you and the recipient. Give one copy to the recipient and retain the original for your case records.
- 534:
  Your signature ———— Date ————
  Recipient's signature ———— Date ————

FIG. 5

HASH-BASED CHAIN OF CUSTODY PRESERVATION

BACKGROUND

Evidence of a crime is collected and used in the prosecution of the individuals committing the crime. Both public officials, such as police officers, and private individuals, such as security personnel at a facility, can identify and collect evidence. Evidence can take the form of damaged property, fingerprints, items left at the scene of a crime, and accounts of eye witnesses to a crime.

Recordings of a crime are a valuable type of evidence because they can reveal when, where, how, and by whom a crime is committed. Video recordings of a crime can be created by security cameras, dash-mounted cameras in police vehicles, cellular telephones, or handheld video recorders. Audio recordings of a crime can be created by voice recorders, monitored walkie-talkies, cellular telephones, or hidden microphones.

Relevant documents can be created by financial transactions, computer applications with logging functionality, or even the criminals themselves when organizing or planning a crime. Such documents are sometimes gathered in connection with the investigation or prosecution of a crime.

The legal requirements for the gathering and presentation of admissible evidence vary somewhat from jurisdiction to jurisdiction. A common thread among most jurisdictions is that to rebut allegations of evidence tampering it is useful to show an uninterrupted chain of custody for the evidence in question.

SUMMARY

In one embodiment, a chain of custody management application is configured to receive electronic recordings and physical evidence data, associate them with a security event, and automatically create and embed a hash value that aids in the authentication of both the electronic recordings and the physical evidence. In this example, electronic recordings are identified and stored together with related physical evidence data. A case management system may create a case record for an incident, present a form to the user and prompt the user to electronically associate an electronic recording and physical evidence to the case record. The case management system optionally issues a call to a verification system which, in this example, automatically creates a first hash value from the electronic recording data and a second hash value from the physical evidence data. The hash values may then be embedded in an electronic case record form that may be printed on demand for use by government authorities. In this embodiment, the embedded hash value may demonstrate that the electronic recordings and physical evidence data have not been altered since at least the time of its entry into the case management system.

The details of one or more implementations are set forth in the accompanying drawings and description below. Other features, objects, and advantages will be apparent from the description and drawings, and from the claims.

DESCRIPTION OF DRAWINGS

FIG. 4 shows an example swim lane diagram of a security system for collecting, documenting, and providing evidence and the chain of custody of the evidence.

FIG. 5 shows an example evidence report graphic user interface used to create a report that includes hash codes for evidence verification.

Like reference symbols in various drawing indicate like elements.

DETAILED DESCRIPTION OF ILLUSTRATIVE IMPLEMENTATIONS

Figure 1:
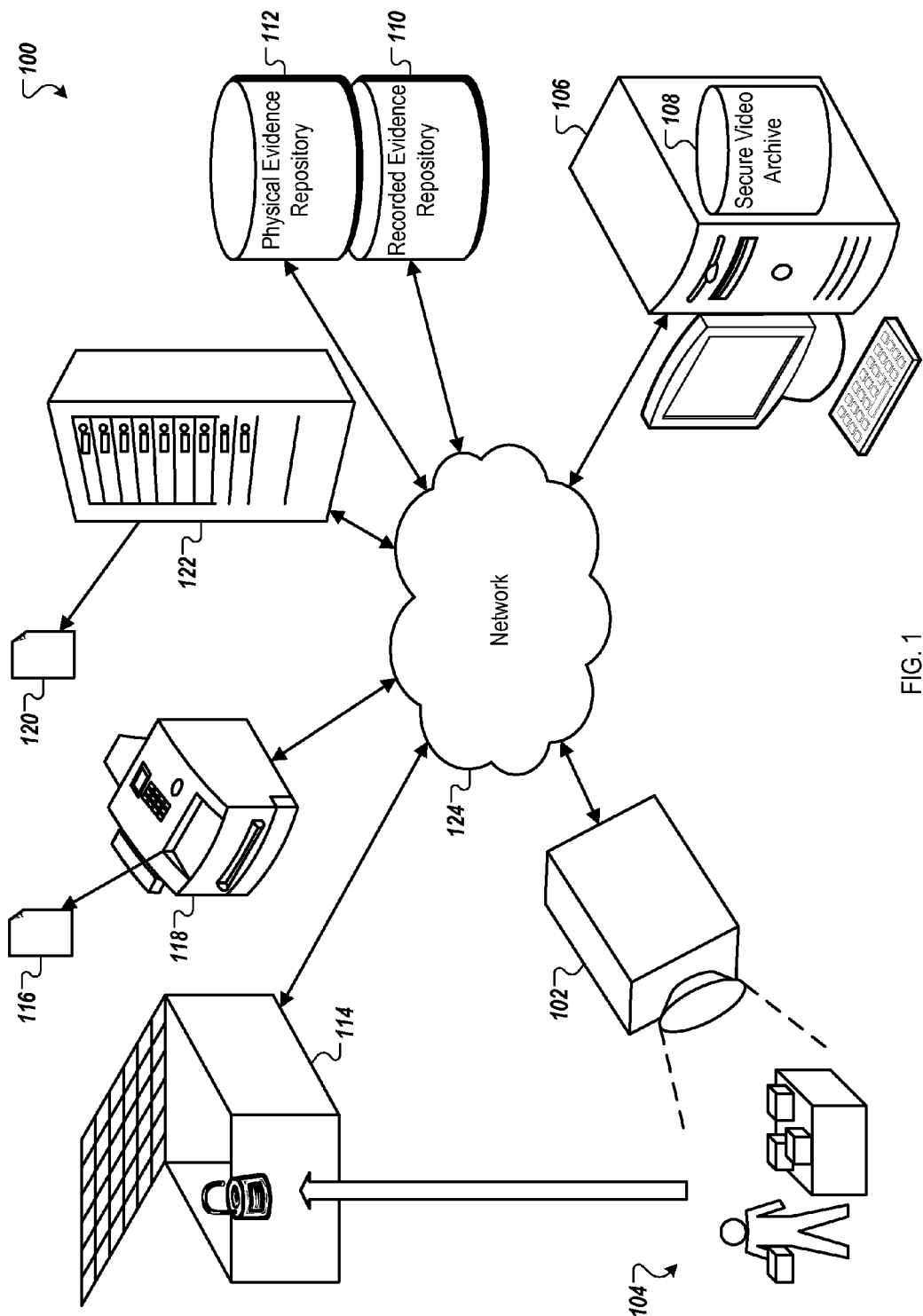
FIG. 1 shows an example system for collecting a recording of an event.

FIG. 1 shows an example system 100 for collecting a recording of an event. The system 100 is used to recover and collect evidence of an event, such as a crime, and to generate documents that show the chain of custody of the evidence, for example, for use in criminal prosecution, civil recovery, and/or internal investigation. The document contains a hash or hash code. The hash is generated with a hash function and one or more data files of evidence. Using the same hash function, the evidence is later verified to show it has not been changed since the hash was generated. A small change to a file that is used to create a first hash, in almost all cases, results in a comparatively large change to a second hash created after the change.

A security camera 102 records video data, including a recording of an event 104. Examples of the event 104 include alleged crimes such as shoplifting, burglary, vandalism, assault, and fraudulent business transactions. A computer 106 receives, via a network 124, video data from the security camera 102, and stores the video data in a recording repository 108. The computer 106 optionally displays the video data, for example, to a security guard.

The event 104 is identified and the video data recording of the event 104 is flagged as recorded evidence. The security event is identified, for example, when a broken window is noticed, a person complains of an assault, an accounting irregularity is discovered by a financial monitoring system, and/or merchandise theft prevention tags set off alarms. Physical evidence of the crime is collected and placed in a storage locker 114. The storage locker 114 is optionally access-restricted, for example by including an electronic lock. In some implementations, the lock communicates, via the network 124, with the computer 106. In the case of a card-swipe lock, the storage locker 114 reports locking and unlocking events to the computer 106. In the case of a computer controlled lock, the computer 106 sends unlock and lock commands to the storage locker.

Physical evidence data is collected and entered into the computer 106. In the case of stolen merchandise, a stock keeping unit (SKU), Universal Product Code (UPC), radio frequency identification (RFID) key, and product serial number are collected. In the case of a broken window, a digital photograph of the broken window and a text description (e.g., "Window broken into building. A brick and glass were discovered on the floor inside of window consistent with the brick being thrown into the window.") are collected.

The computer 106 generates a report of the event 104. The report optionally includes a listing of the files on the recorded evidence repository 110 and physical evidence repository 112, metadata about the recorded evidence such as date and time, recorded evidence and the physical evidence data, and/or a log of access to the storage locker 114 and/or the recording repository 108.

A hash value is created by the computer 106 from the recorded evidence and/or from the physical evidence data, and the hash value is added to the report by the computer 106. The hash value is generated from a hash value function that takes some or all of the recorded evidence and/or some or all of the physical evidence data as parameters and produces a hash value. Example hash value functions include Cyclic Redundancy Check (CRC) functions (e.g., Crc32 Mpeg2), checksum functions (e.g., Adler-32), noncryptographic functions (e.g., Fowler-Noll-Vo), and cryptographic hash value functions (see, e.g., Skein). In some implementations, a single hash value is created from all of the recorded evidence and from all of the physical evidence data. In other implementations, one hash value is created for the recorded evidence and one hash value is created for the physical evidence data. In still further implementations, a hash value is created for each file of the recorded evidence and the physical evidence data.

The recorded evidence is stored in a recorded evidence repository 110 and the physical evidence data is stored in a physical evidence repository 112. Example recorded evidence repositories 110 and example physical evidence repositories 112 include compact disks (CDs), digital versatile discs (DVDs), disk drives (e.g., removable flash memory devices and hard disk drives), databases, and file directories. In some implementations, the recorded evidence repository 110 and the physical evidence repository 112 are implemented in the same system. For example, a single DVD is created containing a portable document format (PDF) file containing a shoplifted item's SKU, UPC, and retail value as well as a video of the item being shoplifted.

The system 100 sends the report to a receiving party. Example receiving parties include police or other government agencies, clients subscribing to a security firm that manages the system 100, prosecution or defense lawyers, and/or private investigators. The report is optionally printed with a printer 118 and a paper- or hard-copy of the report is created. For example, a PDF or hypertext markup language (HTML) report is printed, along with still images of the recorded evidence and physical evidence data. The report is optionally sent as an electronic message by a server 122 or the computer 106. For example, an email report, which contains as attachments the recorded evidence and the physical evidence data, is transmitted by the server 122, which, in this example, is an email server.

Figure 2:
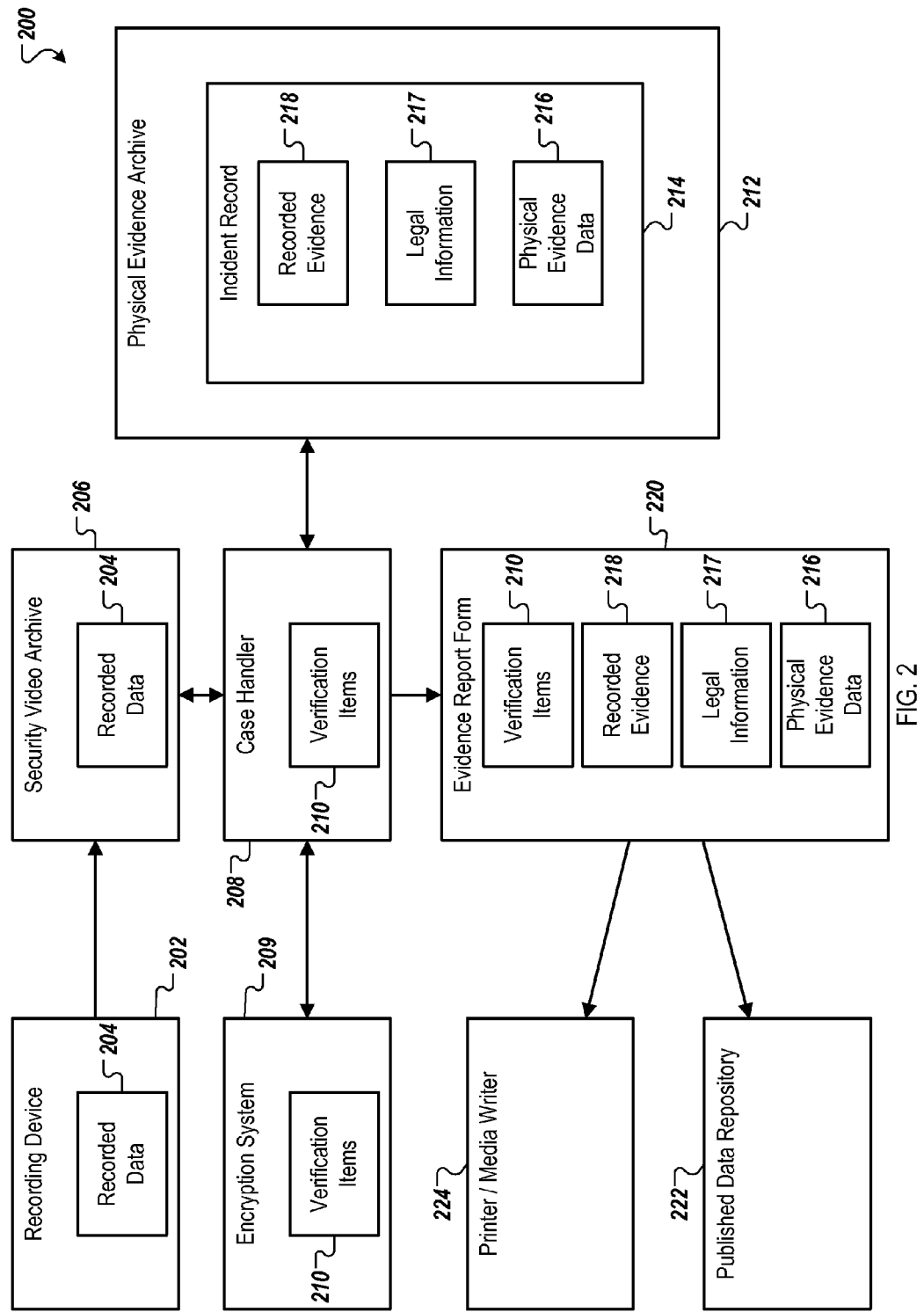
FIG. 2 shows an example computer system for collecting, storing, and verifying evidence.

FIG. 2 shows an example computer system 200 for collecting, storing, and verifying evidence. A recording device 202 records, in one or more retail environments, recorded data 204. The recording device 202 transmits the recorded data 204 to a security video archive 206. A case handler 208 examines the recorded data 204 and identifies security video data that depicts activity related to a security event as recorded evidence 218. The recorded evidence 218 is stored, by the case handler 208, in an incident record 214 in a physical evidence archive 212. The case handler 208 receives, such as from user input, physical evidence data 216 and stores the physical evidence data 216 in the incident record 214. The case handler 208 receives, such as from user input, legal information 217 (e.g., civil recovery information, criminal enforcement information, and/or internal investigation information), and stores the legal information 217 in the incident record 214.

The case handler 208 creates an evidence report form 220. In response to user input selecting and adding the evidence 218 and/or 217 to the evidence report form 220, the encryption system 209 calculates verification items 210. The verification items are created, for example, with a hashing function using the recorded evidence 218 and the physical evidence data 216 as parameters. The case handler 210 adds the verification items 210 to the evidence report form 220. The evidence report form 220 is optionally published to a data repository 222 and/or printed with a printer/media writer 224 to present a representation of the verification times 210 along with the recorded evidence 218 and the physical evidence record 216.

In one implementation, a recording device 202 is a video camera recording a point of sale terminal in a retail store. The recording device 202 captures recorded data 204 as a video of a person distracting a cashier and removing money from the cashier's till (an event known as till tapping). The recorded data 204 is continuously fed from the recording device 202 to a security video archive 206, such as a data storage server in the back office of the retail store. A case handler 208 application executed on a security station computer performs a video analytics process on the recorded data 204. The till tapping event is recognized by the case handler 208 and the recorded data 204 is presented to a security guard user for inspection and verification. Upon log-in and confirmation of the till tapping event by the security guard user, the till tapping event and three minutes of previous recorded data 204 is copied and stored in a physical evidence archive 212. The case handler 208 generates an incident record 214 in the physical evidence archive 212. If the stolen money is recovered, the face value and serial numbers of the recovered bills are entered as physical evidence data 216. A description of the till tapping event is stored as the legal information 217.

Continuing with this implementation, the case handler 208 creates an HTML evidence report form 220. Using the HTML evidence report form 220, the security guard user selects the legal information 217, and links the recorded evidence 218 and the physical evidence data 216. In response to the user selection, the encryption system 209 calculates two verification items 210. The first verification item 210 is a Message-Digest algorithm 5 (MD5) hash created with the recorded evidence 218. The second verification item 210 is an Adler-32 CRC hash created with the physical evidence data 216. The case handler 208 adds the verification items 210 and the security guard's log-in information to the HTML evidence report form 220. The user creates two copies of the evidence report form 220, two copies the physical evidence data 216, and two copies of the recorded evidence 218 using the printer/media writer 224. One copy of the evidence report, one copy of the physical evidence record, one copy of the recorded evidence, and the recovered money are given to the police. One copy of each document is kept by the retail store for their records.

Figure 3:
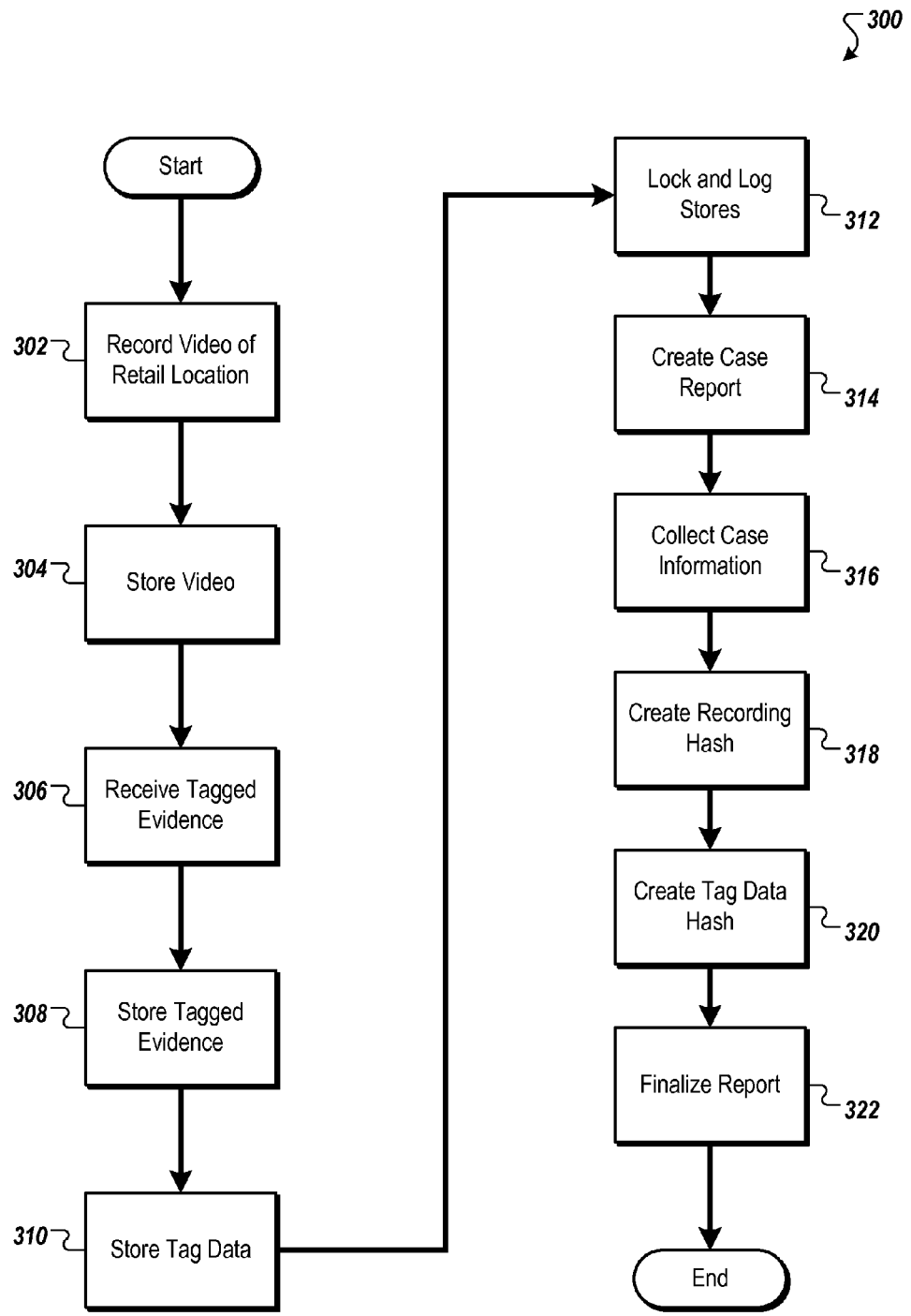
FIG. 3 shows an example flow chart of a process of documenting and preserving the chain of custody of evidence.

FIG. 3 shows an example flow chart of a process 300 of documenting and preserving the chain of custody of evidence. The process 300 is performed by a computer system such as, for example, the system 200.

A video of a retail location is recorded (302) by a video camera in a chain of custody tracking system. For example, video surveillance in a retail location captures video of a security event such as a person passing a bad check. The video is stored (304) by a data repository. When the bad check is discovered, video of the person writing the check is stored in an access controlled database.

Tagged evidence (e.g., evidence containing or assigned identifying information) related to the security event is received (306). If the bad check was declined, merchandise the person attempted to purchase is collected. If the bad check was accepted, the bad check is collected. The tagged evidence is stored (308). The tagged evidence is placed into access controlled storage such as a security locker or a locked office. The data in the tag is stored (310). The bank, routing, and check number or the product UPC and serial number are stored in the access controlled database that stores the video.

Storage devices containing the video, the data in the tag, and the tagged evidence are locked and logged (312). Employees accessing either the access controlled database or the access controlled storage provide credentials, such as a user name and password or an electronic key card.

A case report is created (314). The case report is created from a case report template, and auto-generated or auto-collected data is added to the case report. Example auto-generated or auto-collected data includes, but is not limited to, date, time, user credentials, access log-information, and store location. Case information is then collected (316). A user, such as a store manager, enters information about the security event. A classification, such as fraudulent transaction, is selected, and a narrative description is entered. A recording hash is created (318). The user selects the video recording from the access controlled database. In response, the video recording is added to the case report, and a hash is generated from the video and added to the case report. A tag data hash is created (320). The user selects the tag data from the access controlled database. In response, the tag data is added to the case report, and a hash is generated from the tag data and added to the case report. In some implementations, the steps 318 and 320 are combined, and a single hash is created from both the video and tag data.

The report is finalized (322) and optionally stored to a computer readable medium (e.g., hard disk, CD, DVD), printed, and/or electronically transferred to a remote system.

FIG. 4 shows an example swim lane diagram of a security system 400 for collecting, documenting, and providing evidence and the chain of custody of the evidence. In the example shown, a shoplifting event is detected, evidence is collected, police are notified, and a chain of custody report is generated.

A security camera 402 records customer activity in a retail store. The camera feed is transmitted to a security station 404, where a security guard and/or video analytics processes look for criminal activity in the feed. An evidence server 406 stores electronic evidence identified by the security station 404. A printer 408 and a DVD burner 410 are communicably coupled to the evidence server 406. A police server 412 receives reports and evidence of criminal activity from the retail store.

The security camera 402 records (414) customer activity, including a customer shoplifting. The security camera 402 transmits the recording to the security station 404, which stores (416) the recording to a hard disk (416). The recording is displayed on the security station 404, and a security guard watching the recording or a video analytics application identifies (418) the shoplifting in the recording. After secondary verification by the security guard, the security station 404 sends a report of criminal activity to the police server 412 (420). Video evidence of the shoplifting event is saved (422) by the evidence server 406. If the security guard is able to recover the stolen merchandise, the bar code of the merchandise is read by the security station 404, the serial number of the merchandise is received, and the merchandise is locked (424) in the security station. The barcode information and serial number are received by the evidence server, which looks up the merchandise product information and stores (426) a complete description of the merchandise, including the price, make, model, and product photograph.

A document is generated (428) by the security station 404 from a shoplifting event document template. The specific details, such as date and time, evidence files, a description of the alleged crime, the name of the security guard, and an activity log are received by the security station and included in the document. The document is finalized (430) by the security station 404 by generating a hash for each file in the evidence server 406 that is related to the shoplifting event. The document lists the file names and the associated hash. The document is stored (432) in the evidence server. A hard copy of the document and still photos of the video data are printed (434) by the printer 408. The video is burned (436) to a DVD by the DVD burner 410 and the DVD and document hard copy are sealed in an envelope and stored by the retail store. A copy of the document, the video, and the physical evidence description is uploaded to the police server 412 (440). In some implementations, an officer responding to the report (420) receives the electronic evidence (440) in a vehicle mounted computer and arrives at the retail store with all available information.

FIG. 5 shows an example evidence report graphical user interface (GUI) 500 used to create a report that includes hash codes for evidence verification. The GUI 500 presents data entry fields that are completed in the process of documenting the chain of custody of evidence. The GUI 500, in some implementations, is displayed by the computer 106, the case handler 208, and/or the security station 404.

The GUI 500 is a visual front end that is displayed by a chain of custody application. The GUI 500 takes the form of a window native to the operating system in which the chain of custody application is executing and optionally displays a title describing the type of evidence handled.

Input fields 502 and 504 are used to verify the identity of a user and to log-into the chain of custody application. A user name or local area network (LAN) identification is entered into the input field 502. A password is entered into the input field 504, which is masked to display asterisks ("*") instead of the password. An automated field 506 is automatically populated with the date and time of the login, for logging and verification purposes. An input field 508 is used to record a case management number, which is used to track a case, crime, or event to which the evidence is related. In some configurations, the input field 508 creates a new case management number to ensure each case management number is unique and conforms to predefined naming conventions. An input field 509 is used to record the disposition of evidence. Various states of evidence disposition may be tracked, including retention in a secured environment, transfer to government authorities, return to stock, return to an individual, and transfer to a user within the retail enterprise. Data entered into the system that reflects evidence disposition may optionally be hashed, either individually or jointly with other data as described elsewhere herein. The resulting hash value(s) may be depicted, displayed and transmitted as described elsewhere herein.

An input field 510 is used to record the name, title, and/or rank of the person or persons receiving the evidence. For example, the text "Capt. John Doe" is input for a police captain named John Doe. An input field 512 is used to record the organization or agency that the person listed in the input field 510 represents. For example, the name of a police force, government agency, or private security firm is recorded in the input field 510.

A dropdown box 514 is used to select the evidence type and/or medium that stores the evidence. When a selection is made in the dropdown box 514, the type or medium selected is listed in an automated field 516, 518, or 520. In the case of more than three types or media selected, additional automated fields are created by the GUI 500.

An input field 522 is used to record the directory path and filename of electronic evidence and data files associated with physical evidence. In the example shown, the files are security camera footage of a person stealing an item (Case 1234/Location 456/Theft/Enterance Camera View.mpg), security camera footage of a person getting into a car with the stolen item (Case 1234/Location 456/Theft/Parking Lot Camera View.mpg), and a data file containing the manufacturer, product code, and serial number of a card-swipe lock that was damaged during the theft (Case 1234/Location 456/Vandalism/Damaged Property/Lock.dat). A button 524, when selected, launches a dialog box for selecting files. When files are selected in the dialog box, the directory path and filename of the selected files is appended to the input field 522.

A button 526, when selected, creates a hash in an automated field 530. In this example, the hash in the automated field 530 is calculated using the three files in the input field 522. In another example, the button 526, when selected, creates a hash in the automated field 530 for each file listed in the input field 522.

A button 528, when selected, submits or prints a report generated from the information in the GUI. The buttons 524, 526, and 528 are non-printing GUI objects. When the button 528 is selected, the submitted and/or printed reports omit the buttons 524, 526, and 528.

Instructions 532 are instructions for the user. The instructions direct the user to initial and date the evidence, and to print two copies, if possible. Signature lines 534 provide a place for the user and the recipient to sign and date the printed report.

Figure 6:
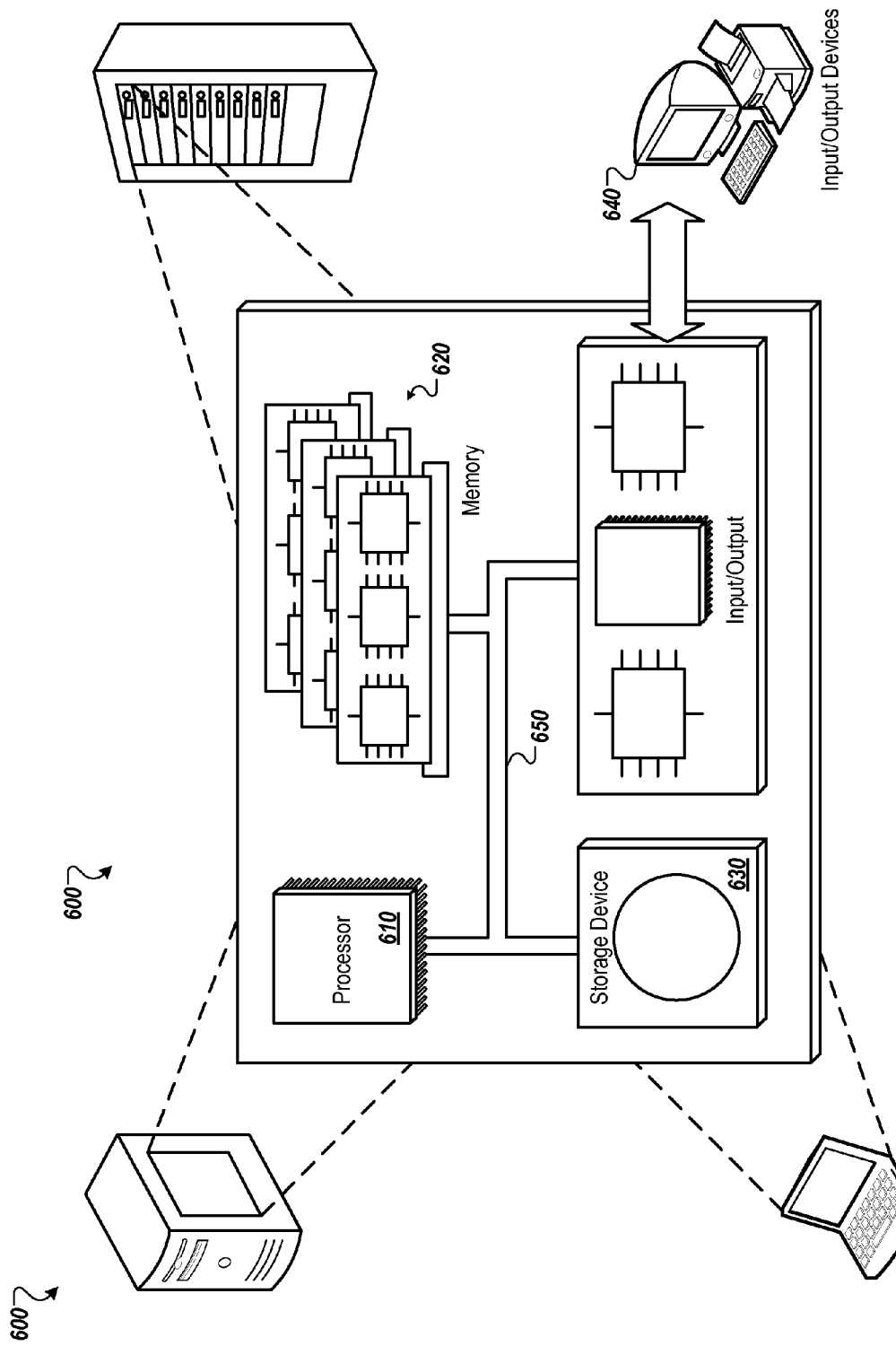
FIG. 6 is a block diagram of a computing system optionally used in connection with computer-implemented methods described in this document.

FIG. 6 is a schematic diagram of a generic computer system 600. The system 600 is optionally used for the operations described in association with any of the computer-implemented methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 is optionally a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example; semiconductor memory devices, such as EPROM, EEPROM, and flash memory devices, magnetic disks such as internal hard disks and removable disks, magneto-optical disks, and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the one described. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A system for tracking the chain of custody of evidence, the system comprising:
    a security video archiving system to electronically receive and store footage captured by security cameras in one or more retail environments;
    a physical evidence archival system to electronically catalog physical evidence associated with a plurality of security events, the physical evidence is physical evidence of a crime;
    a case management system to associate with each of the security events
        i) security video data that depicts activity related to the security event,
        ii) physical evidence related to the security event, and iii) one or more additional items selected from the group consisting of civil recovery information, criminal enforcement information, and internal investigation information, the case management system including a form manager to present an electronic form that identifies the security video data, the physical evidence related to the security event, and the one or more additional items and to permit a user to associate security video data to the security event by electronically selecting the security video data; and
    an encryption system for creating at least a first hash value for the selected security video data and electronic data associated with the physical evidence related to the security event, said encryption system being configured to automatically transmit the at least the first hash value to the case management system;
    wherein the case management system causes the at least the first hash value to be associated with the security video data and the electronic data associated with the physical evidence related to the security event and wherein the form manager electronically presents a representation of the at least first hash value along with the security video data, the physical evidence related to the security event, and the one or more additional items.

2. The system of claim 1, wherein the encryption system creates a single hash value based on the security video data and the electronic data associated with the physical evidence related to the security event.

3. The system of claim 1, wherein the case manager associates with each of the security events a further item selected from the group consisting of civil recovery information, criminal enforcement information, and internal investigation information.

4. The system of claim 1, further comprising an access control system to restrict access to the case management system, the video archiving system, and the physical evidence archival system to users having predetermined credentials and to track said users' activities in said systems.

5. The system of claim 1, wherein the security event is a criminal act.

6. The system of claim 1, wherein a first hash value is created for the selected security video data and a second hash value is created for the electronic data associated with physical evidence, the first hash value being different from the second hash value and determined by a different hash function than the second hash value the first hash value.

7. The system of claim 1, wherein the data associated with the physical evidence includes data unique to the physical evidence and is one of a group stock keeping unit, Universal Product Code, radio frequency identification key and serial number.

8. The system of claim 1, further comprising a reporting system to generate a report that includes data reflecting users' activities in said systems and the at least the first hash value.

9. A method for verifying the chain of custody for evidence associated with a retail security event, the method comprising:
    electronically receiving from a retail security video system video data files and storing the video data files in a video archiving system, each of the video data files representing footage of security events;
    physically receiving, from a retail security entity; physical evidence items and storing the physical evidence items in a secure repository, each of the physical evidence items being related to the security events, each of said physical evidence items including data related to one or more of the security events, the physical evidence items are physical evidence of a crime;
    electronically cataloging the physical evidence items by recording data from said items into a physical evidence archival database;
    restricting electronic access to the video archiving system and the physical evidence archival database to users having specified credentials;
    tracking said users' activities in the video archiving system and the physical evidence archival database;
    creating, with a computer implemented case management system, a case record for each security event that associates the security event with a video data file that depicts activity related to the security event, a physical evidence item related to the security event, criminal enforcement information, and private investigation information;
    presenting an electronic form that displays the case record and identifies the associated physical evidence item, criminal enforcement information, and private investigation information;
    receiving user input selecting a video data file to associate with the case record;
    creating, using an encryption system, at least a first hash value that is a function of data in the associated video data file and data from the associated physical evidence item such that later modification of the video data file and data from the associated physical evidence item can be detected;
    associating the encryption system with the case management system such that the case management system can receive the at least first hash value;
    identifying, in the electronic form, at least the first hash value; and
    reporting users' activities in the video archiving system and the physical evidence archival database together with the at least the first hash value.

10. The method of claim 9, wherein the method includes associating with each of the security events civil recovery information.

11. The method of claim 9, wherein the security event is a criminal act.

12. The method of claim 9, wherein the data included with the physical evidence items comprises a group stock keeping unit, Universal Product Code, radio frequency identification key, serial number, photograph of the physical evidence, or textual description of the physical evidence item.

13. A non-transitory computer-readable medium, embodied in a device, on which medium is encoded program code configured for execution by a processor to perform a method for receiving and transmitting event information, the method comprising:
   electronically receiving from a retail security video system video data files and storing the video data files in a video archiving system, each of the video data files representing footage of security events;
   physically receiving, from a retail security entity, physical evidence items and storing the physical evidence items in a secure repository, each of the physical evidence items being related to the security events, each of said physical evidence items including data related to one or more of the security events;
   electronically cataloging the physical evidence items by recording data from said items into a physical evidence archival database;
   restricting electronic access to the video archiving system and the physical evidence archival database to users having specified credentials;
   tracking said users' activities in the video archiving system and the physical evidence archival database;
   creating, with a computer implemented case management system, a case record for each security event that associates the security event with a video data file that depicts activity related to the security event, a physical evidence item related to the security event, criminal enforcement information, and private investigation information;
   presenting an electronic form that displays the case record and identifies the associated physical evidence item, criminal enforcement information, and private investigation information;
   receiving user input selecting a video data file to associate with the case record;
   creating, using an encryption system, at least a first hash value that is a function of data in the associated video data file and data from the associated physical evidence item such that later modification of the associated video data file and data from the associated physical evidence can be detected;
   associating the encryption system with the case management system such that the case management system can receive the at least first hash value;
   identifying, in the electronic form, the at least the first hash value; and
   reporting users' activities in the video archiving system and the physical evidence archival database together with the at least the first hash value.

14. The medium of claim 13, wherein the method further includes generating a first hash value based on data in the associated video data file and a second hash value based on the data from the associated physical evidence item.

15. The medium of claim 13, wherein the method includes associating with each of the security events civil recovery information.

16. The medium of claim 13, wherein the security event is a criminal act.

17. The medium of claim 13, wherein a first hash value is created based on data in the associated video data file and data from the associated physical evidence item.

18. The medium of claim 14, wherein the data from the associated physical evidence items comprises a group stock keeping unit, Universal Product Code, radio frequency identification key, serial number, photograph of the physical evidence, or textual description of the physical evidence.

* * * * *